L. B. COLE.
INSULATING END PLATE.
APPLICATION FILED DEC. 4, 1920.
1,397,363.
Patented Nov. 15, 1921.
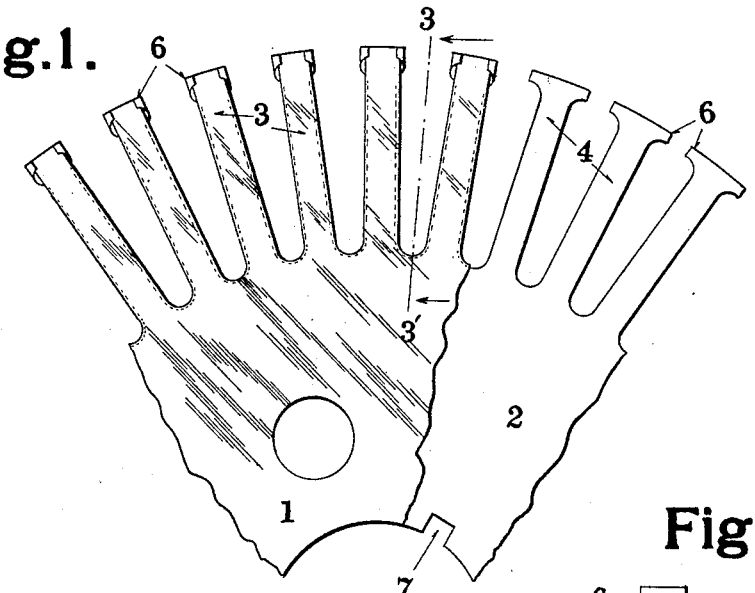
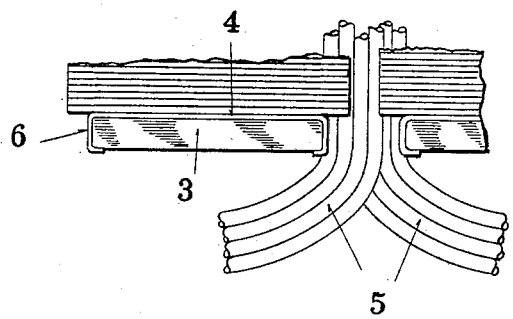
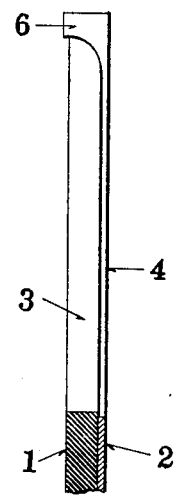
INVENTOR
L. B. Cole
BY E. E. Huffman
ATTORNEY

UNITED STATES PATENT OFFICE.

LOVELL B. COLE, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

INSULATING END PLATE.

1,397,363.  Specification of Letters Patent.  Patented Nov. 15, 1921.

Application filed December 4, 1920. Serial No. 428,409.

*To all whom it may concern:*

Be it known that I, LOVELL B. COLE, a citizen of the United States of America, residing at the city of St. Louis, State of Missouri, United States of America, have invented a certain new and useful Insulating End Plate, of which the following is such a full, clear, and exact description as will enable any one skilled in the art to which it appertains to make and use the same, reference being had to the accompanying drawings, forming part of this specification.

My invention relates to an insulating end plate for core structures of electrical machinery, the object being to obviate the danger of parts of the windings being brought into electrical contact with the edges of the slots where they are bent at leaving the slot to direct them to another slot.

In the accompanying drawings which illustrate an embodiment of my invention, Figure 1 is a view of a portion of an insulating rotor end plate constructed in accordance with my invention; Fig. 2 is a fragmentary top view illustrating the position of my improved end plate with relation to the windings and slots of a core structure; and Fig. 3 is a cross section on the line 3—3' of Fig. 1.

1 represents an insulating sheet or disk, which may be of pressed fiber or other suitable material and which is punched to form teeth and slots approximately conforming to those of the laminæ of the electrical core structure omitting however the lateral extensions with which the ends of the laminæ teeth are usually provided. 2 is a reinforcing sheet of metal likewise stamped to form teeth and slots substantially conforming to those of the laminæ in connection with which the end plate is to be used. The teeth 3 of the insulating disk 1 are however preferably made slightly wider than the teeth of the laminæ. The lateral extensions 6 of the teeth 4 of the sheet 2 are bent inward to embrace the edges of the insulating teeth and may extend over to the outward face of said teeth as indicated in the figures. The securing of the ends of the insulating teeth to the metal teeth prevents relative circumferential motion of the insulating teeth and metal teeth and the bending or breaking of the insulating teeth which would otherwise frequently occur when the winding 5 is brought into position in the slots. The sheet 2 may be held against rotation with respect to the core by the groove 7 coöperating with a spline by means of which the core laminæ are held.

It will be noted that by the application of one of my new end plates at each end of the core structure the cutting through of the insulation on the winding where it is bent around the edges of the slots will not result in grounding since the edges against which the conductors bear are themselves of insulating material and cannot readily be displaced by the pressure of the winding. By making the teeth 3 slightly wider than the reinforcing teeth 4, the edges of the teeth 3 may be subjected to considerable pressure or other abuse in applying the windings without danger of bringing the winding into sufficiently close contact with the edges of the laminæ to endanger the insulation at that point.

Having fully described my invention what I claim as new and desire to secure by Letters Patent of the United States is:

1. An insulating plate adapted to be positioned at the end of a slotted core structure of electrical machinery and comprising a sheet of insulating material having teeth and winding slots and a sheet of reinforcing material provided with teeth facing and connected with the teeth of the insulating material.

2. An insulating plate adapted to be positioned at the end of a slotted core structure of electrical machinery and comprising a sheet of insulating material having teeth and winding slots and a metal plate provided with teeth facing the teeth of the sheet of insulating material, said metal teeth having terminal extensions embracing the edges of the insulating teeth.

3. An insulating plate adapted to be positioned at the end of a slotted core structure of electrical machinery and comprising a sheet of insulating material having teeth and winding slots and a metal plate provided with teeth facing the teeth of the sheet of insulating material and narrower than said insulating teeth, said metal teeth having terminal extensions embracing the edges of the insulating teeth.

4. A slotted core structure for electrical machinery having at each end an insulating plate slotted to conform to the slots in the core, said plate comprising a sheet of insulating material backed by a sheet of metal, the ends of the teeth of the metal sheet and of the insulating material being secured against relative circumferential movement, and the metal sheet being secured against movement relative to the core.

In testimony whereof, I have hereunto set my hand and affixed my seal.

LOVELL B. COLE. [L. S.]